United States Patent [19]
Lee et al.

[11] Patent Number: 5,563,421
[45] Date of Patent: Oct. 8, 1996

[54] APPARATUS AND METHOD FOR ELIMINATING RESIDUAL CHARGES IN AN IMAGE CAPTURE PANEL

[75] Inventors: Denny L. Y. Lee, West Chester; Lawrence K. Cheung, Berwyn, both of Pa.

[73] Assignee: Sterling Diagnostic Imaging, Inc., Newark, Del.

[21] Appl. No.: 475,449

[22] Filed: Jun. 7, 1995

[51] Int. Cl.⁶ .................................................. G01N 23/04
[52] U.S. Cl. .................................. 250/580; 250/370.09
[58] Field of Search .................................. 250/580, 591, 250/370.09

[56] References Cited

U.S. PATENT DOCUMENTS

| | | | |
|---|---|---|---|
| 4,954,706 | 9/1990 | Takahashi et al. | 250/580 |
| 5,127,038 | 6/1992 | Jeromin et al. | 378/28 |
| 5,166,524 | 11/1992 | Lee et al. | 250/580 |
| 5,168,160 | 12/1992 | Jeromin et al. | |
| 5,254,480 | 10/1993 | Tran . | |
| 5,262,649 | 11/1993 | Antonuk et al. | 250/370.09 |
| 5,313,066 | 5/1994 | Lee et al. | 250/370.09 |
| 5,319,206 | 6/1994 | Lee et al. | 250/370.09 |
| 5,331,179 | 7/1994 | Lee et al. | 250/591 |

Primary Examiner—Carolyn E. Fields
Attorney, Agent, or Firm—Thomas H. Magee

[57] ABSTRACT

An image capture panel includes a plurality of sensors arrayed adjacent to a substrate layer of dielectric material, and a radiation sensitive layer disposed over the sensors. The radiation sensitive layer is exposed to a first substantially uniform pattern of light radiation for partially neutralizing residual electrical charges trapped within the image capture panel. The radiation sensitive layer is then exposed to a second substantially uniform pattern of light radiation sufficient to neutralize substantially all residual electrical charges trapped within the image capture panel.

19 Claims, 4 Drawing Sheets

APPARATUS AND METHOD FOR ELIMINATING RESIDUAL CHARGES IN AN IMAGE CAPTURE PANEL

BACKGROUND OF THE INVENTION

1. Field of the Invention

The present invention pertains to an image capture panel for capturing direct radiographic images. More particularly, the present invention pertains to a method and apparatus for eliminating residual electrical charges residing in the image capture panel prior to capture of a subsequent radiographic image.

2. Description of the Related Art

Traditional medical diagnostic processes record X-ray image patterns on silver halide films. These systems direct an initially uniform pattern of interrogating X-ray radiation through a patient to be studied, intercept the consequently imagewise modulated pattern of X-ray radiation with an X-ray radiation intensifying screen, record the intensified pattern in a silver halide film, and chemically transform this latent radiation pattern into a permanent and visible image, called a radiogram.

Radiograms have also been produced by using layers of radiation sensitive materials to directly capture radiographic images as imagewise modulated patterns of electrical charges. Depending on the intensity of the incident X-ray radiation, electrical charges generated either electrically or optically by the X-ray radiation within a pixelized area are quantized using a regularly arranged array of discrete solid state radiation sensors. U.S. Pat. No. 5,319,206, issued to Lee et al. on Jun. 7, 1994 and assigned to E. I. du Pont de Nemours and Company, describes a system employing a layer of photoconductive material to create an imagewise modulated areal distribution of electron-hole pairs which are subsequently converted to corresponding analog pixel (picture element) values by electrosensitive devices, such as thin-film transistors. U.S. Pat. No. 5,262,649 (Antonuk et al.) describes a system employing a layer of phosphor or scintillation material to create an imagewise modulated distribution of photons which are subsequently converted to a corresponding image-wise modulated distribution of electrical charges by photosensitive devices, such as amorphous silicon photodiodes. U.S. Pat. No. 5,254,480 (Tran) describes a system which combines a luminescent layer, to create a distribution of photons, with an adjacent layer of photoconductive material to create a corresponding imagewise modulated distribution of electrical charges which are subsequently converted to corresponding analog pixel values for the image by electrosensitive devices. These solid state systems have the advantage of being useful for repeated exposures to X-ray radiation without consumption and chemical processing of silver halide films.

In systems utilizing a photoconductive layer, before exposure to imagewise modulated X-ray radiation, the top areal surface of the photoconductive layer is uniformly biased relative to electrical charge read-out means by application of an appropriate electric field. During exposure to X-ray radiation, electron-hole pairs are generated in the photoconductive layer in response to the intensity of the imagewise modulated pattern of X-ray radiation, and these electron-hole pairs are separated by the applied biasing electric field. The electron-hole pairs move in opposite directions along the electric field lines toward opposing surfaces of the photoconductive layer. After the X-ray radiation exposure, a latent image in the form of an imagewise distribution of electrical charges of varying magnitude is captured within the photoconductive layer, representing a latent electrostatic radiogram. A plurality of charge capture elements and switching devices proximate the photoconductive layer are adapted to readout the imagewise distribution of electrical charges, thereby providing a pixelized radiogram.

A problem with such an electrical charge capture and readout scheme is that after exposure to X-ray radiation is stopped and the electronic charge distribution within the photoconductive layer is determined by readout, some of the electrical charges induced within the photoconductive layer may continue to reside as charges trapped not only within the photoconductive layer but also at planar interfaces between the surfaces of the photoconductive layer and adjacent layers. These residual electrical charges must be fully eliminated prior to the next X-ray exposure. Otherwise, a false image pattern related to the previous radiation pattern may be added to subsequent radiograms.

It is known to intentionally flash expose a photoconductive layer of an image capture element to a large dose of actinic radiation to eliminate residual electrical charges stored in the photoconductive layer by momentarily rendering the photoconductive layer substantially conductive, for example, as described in U.S. Pat. No. 5,166,524, issued to Lee et al. on Nov. 24, 1992 and assigned to E. I. du Pont de Nemours and Company. However, such an image capture element must be partially disassembled by physical separation of a conductive contacting layer, such as conductive foam or rubber, from an array of charge capturing microplates before the flash exposure is made. Also, a large neutralizing current may be locally created by the flash exposure and exceed the current capacities of nearby readout components. Residual charges have also been minimized by application of a reversed and decreasing electric field, for example, as described in U.S. Pat. No. 5,319,206. However, this process involves multiple applications of a decreasing and reversed electric field to fully neutralize residual electrical charges remaining in the photoconductive layer.

SUMMARY OF THE INVENTION

The present invention provides an apparatus and method for eliminating residual charges in an image capture panel that includes a plurality of sensors arrayed adjacent to a substrate layer of dielectric material. A radiation sensitive layer is disposed over the sensors. The radiation sensitive layer is exposed to a first substantially uniform pattern of light radiation for partially neutralizing residual electrical charges trapped within the image capture panel. The radiation sensitive layer is then exposed to a second substantially uniform pattern of light radiation sufficient to neutralize substantially all residual electrical charges trapped within the image capture panel.

DETAILED DESCRIPTION OF THE PREFERRED EMBODIMENT(S)

Figure 1:
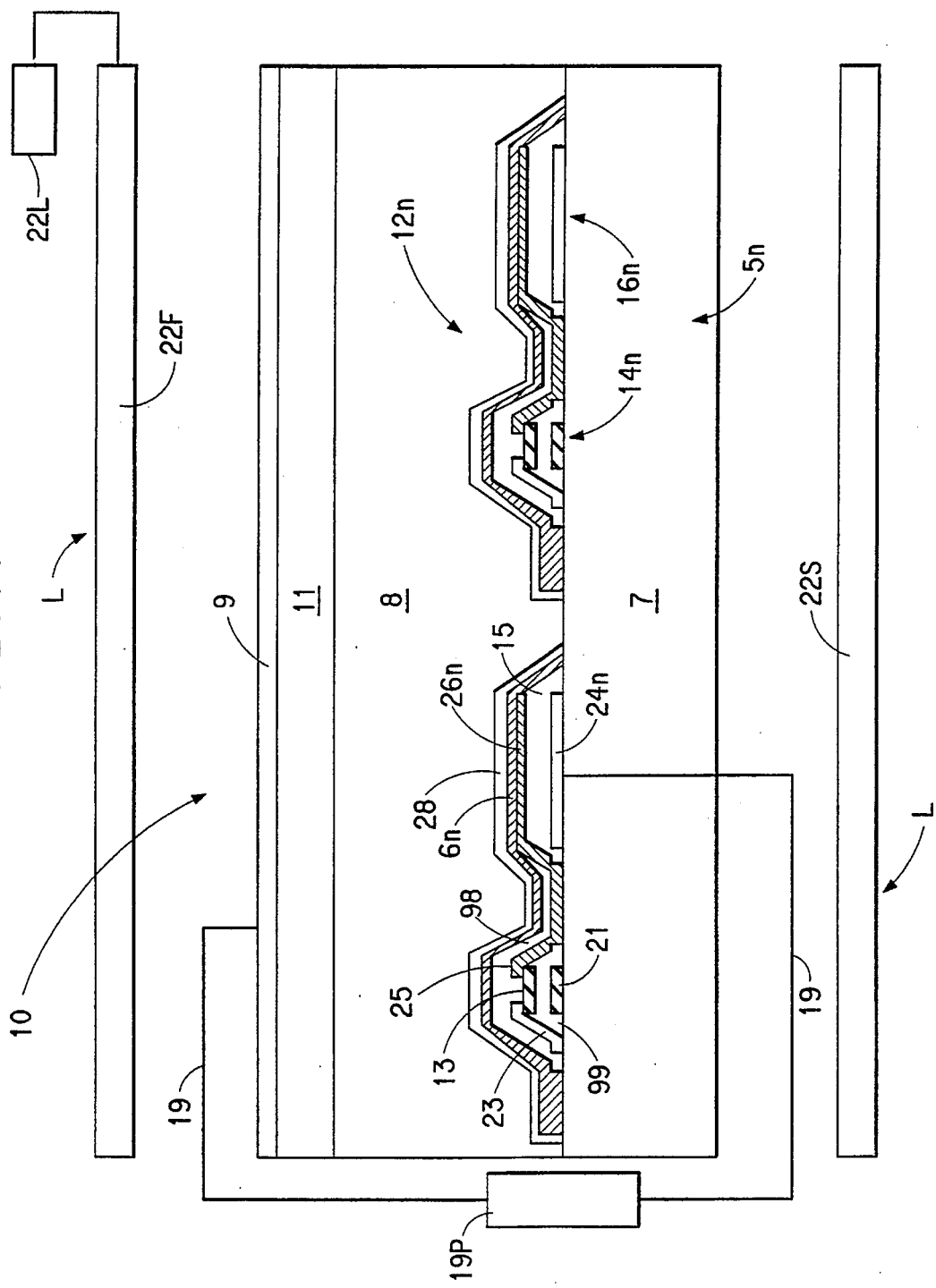
FIG. 1 is a schematic cross-sectional view of an X-ray image capture element illustrating the present invention.

FIG. 1 shows an X-ray image capture panel 10 for capturing an imagewise modulated pattern of incident radiation. Radiation is herein meant to include high energy electromagnetic waves, especially X-rays with energy levels between about 20 Key and about 150 Key. The image capture panel 10 comprises a dielectric substrate layer 7 having a top and bottom surface. A plurality of radiation sensitive sensors 12n (i.e., 12a, 12b, 12c, . . . , 12n) are arrayed adjacent the top surface of the layer 7 in a matrix of rows and columns. The sensors 12n are read out by suitable electrical readout means 5n. The readout means 5n typically comprises means for electronically accessing each of the sensors 12n individually, and means for individually determining electric charge captured in the sensors 12n. The sensors 12n comprise a plurality of switching devices 14n (i.e., 14a, 14b, 14c, . . . , 14n) and a plurality of sensing elements 16n (i.e., 16a, 16b, 16c, . . . , 16n). The sensing elements 16n comprise a first plurality of conductive microplates 24n (i.e., 24a, 24b, 24c, . . . , 24n) deposited on the substrate layer 7 and covered with a capacitive dielectric material 15, for example, silicon dioxide. A second plurality of conductive microplates 26n (i.e., 26a, 26b, 26c, . . . , 26n) are deposited over the substrate layer 7. The substrate layer 7 preferably comprises a material substantially transparent to light, for example, glass. The conductive microplates 24n and 26n have a low optical density, for example, a thin layer of indium-tin-oxide (ITO) or a thin layer between 50 and 100 Å of metal, such as gold or aluminum.

FIG. 1 shows the sensing elements 16n which function as charge storage capacitors formed by the microplates 26n, the microplates 24n and the capacitive dielectric material 15. Each microplate 26n is connected to the adjacent switching device 14n. The switching devices 14n are preferably thin-film field effect transistors (FETs) comprising a layer 13 of hydrogenated amorphous-silicon, crystalline silicon, poly-crystalline silicon or cadmium selenide, an insulating layer 99, a conductive gate 21 and two conductive electrodes 23 and 25. Each electrode 23 is connected to one of a plurality of readout lines 20n (shown in FIG. 2) and acts as a drain electrode. Each electrode 25 is connected to one of the microplates 26n and acts as a source electrode. Each switching device 14n has its gate 21 connected to a switching line 18n (shown in FIG. 2), and serves as a bi-directional switch allowing current flow between the readout line 20n and the sensing element 16n depending on whether a bias voltage is applied to the gate 21 through the switching line 18n. Each switching device 14n is covered with a passivation layer 98. Preferably, the passivation layer 98 has a thickness greater than that of the insulating layer 99. The technology for creating the switching devices 14n is well known in the art. See, for instance, "Modular Series on Solid State Devices," Volume 5 of *Introduction to Microelectronics Fabrication* by R. C. Jaeger, published by Addison-Wesley in 1988.

The sensing elements 16n further comprise a plurality of conductive collecting elements 6n (i.e., 6a, 6b, 6c, . . . , 6n) deposited, respectively, over the microplates 26n and over the switching devices 14n. Over the top surface of the collecting elements 6n is disposed a charge blocking layer 28 having a thickness selected to prevent charge leakage. Both the conductive collecting elements 6n and the charge blocking layer 28 also have a low optical density. The charge blocking layer 28 is preferably provided by an aluminum oxide layer formed on the collecting elements 6n although other blocking interfaces may also be used.

Figure 2:
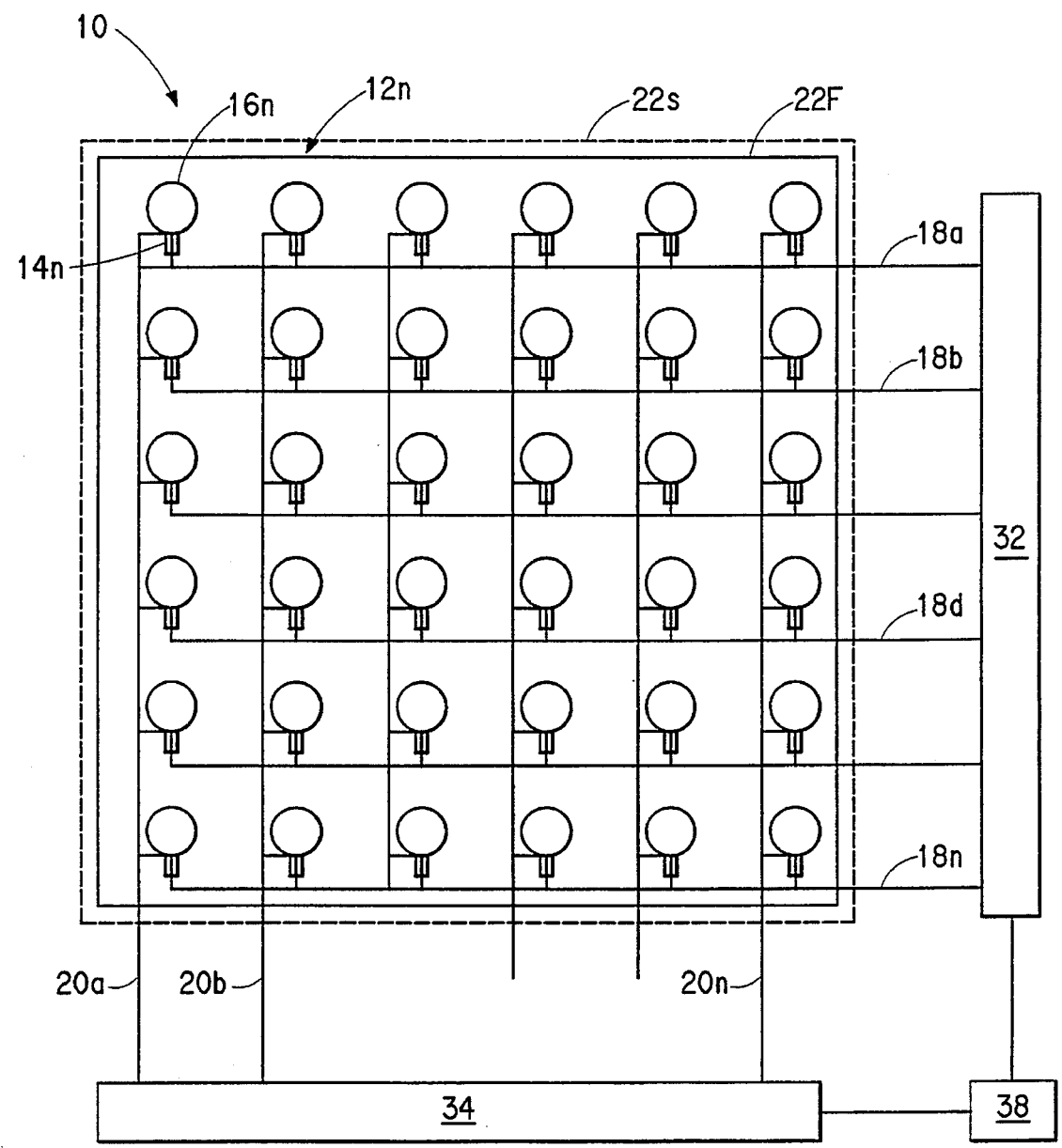
FIG. 2 is a schematic top view of the X-ray image capture element shown in FIG. 1.

FIG. 2 shows a plurality of conductive switching lines 18n and conductive readout lines 20n disposed in the spaces between the sensors 12n. The switching devices 14n are disposed in the spaces between the sensing elements 16n, the switching lines 18n, and the readout lines 20n. The switching lines 18n are individually accessible through a plurality of leads connected to a multiplexing device 32. As mentioned before, each switching device 14n serves as a bi-directional switch allowing current flow between the readout line 20n and the sensing element 16n depending on whether a bias voltage is applied to the gate 21 through the switching line 18n.

FIG. 1 further shows a radiation sensitive layer 8, preferably a layer of photoconductive material, disposed over the charge blocking layer 28, the switching lines 18n and the readout lines 20n. The combination of layers 6n, 28 and 8 behaves as a blocking diode, inhibiting one type of charge flow in one direction. The photoconductive layer 8 preferably exhibits very high dark resistivity and may comprise amorphous selenium, lead oxide, thallium bromide, cadmium telluride, cadmium sulfide, mercuric iodide or any other such material. The photoconductive layer 8 may also comprise organic materials such as photoconductive polymers loaded with X-ray absorbing compounds, which exhibit photoconductivity. In a preferred embodiment, the photoconductive layer 8 comprises 300 to 500 micrometers of amorphous selenium in order to provide high efficiency in X-ray radiation detection, and the charge blocking layer 28 has a thickness greater than 100 Å.

A top dielectric layer 11 having a thickness greater than one micrometer is disposed over the top surface of the photoconductive layer 8. Mylar® (i.e., polyethylene terephthalate) film with a thickness of 25 micrometers may be laminated for the dielectric layer 11 or, preferably, a dielectric material such as Parylene® (i.e., poly-xylylene) may be vacuum deposited to form the dielectric layer 11. A final top conductive layer 9, having a low optical density, for example, a thin layer of indium-tin-oxide (ITO) or a thin layer between 50 and 100 Å of metal like chromium, being essentially transparent to light, is formed uniformly over the top dielectric layer 11. The entire image capture panel 10 can be made by depositing sensors 12n, blocking layer 28, photoconductive layer 8, top dielectric layer 11, and top conductive layer 9 upon the dielectric substrate layer 7. Fabrication may be accomplished, for example, by plasma-enhanced chemical vapor deposition, vacuum deposition, lamination, or sputtering.

FIG. 1 shows light exposure means L juxtaposed the image capture panel 10. It has been discovered that the light exposure means L is effective in eliminating residual electrical charges that may reside within the image capture panel 10 and create a false image in a subsequent imagewise radiation operation. The light exposure means L is positioned to provide a uniform pattern of low energy light radiation over the photoconductive layer 8. In a preferred embodiment, the light exposure means L comprises a first light emitting panel 22F positioned above and displaced a small distance, for example 2 millimeters, from the top conductive layer 9. The first panel 22F is adapted to expose the photoconductive layer 8 to a first pattern of low energy light radiation. The term "light" is used herein to describe low energy electromagnetic radiation having wavelengths in the range 400 to 800 nanometers with energy in the range 20 to 1000 erg/cm$^2$. This first pattern of low energy light radiation is selected to have wavelengths and energy such that the light is capable of penetrating the top conductive layer 9 and top dielectric layer 11 with minimal absorption but being essentially totally absorbed near the top portion of the photoconductive layer 8. Preferably, the light emitting panel 22F is a panel woven from plastic strands of optic fibers, like that available from Lumitex, Inc., Strongsville, Ohio. The panel 22F should be capable of providing a substantially uniform pattern of low energy light radiation, have a broad range of wavelengths in the 400 to 800 nanometers range, and provide energy per unit area in the range from 20 to 1000 erg/cm$^2$, preferably about 500 erg/cm$^2$. Since X-rays must penetrate the first panel 22F during patient exposure, it is necessary that the first panel 22F comprise material having both low X-ray attenuation and a uniform X-ray density. The uniform X-ray density is important in order to prevent any internal panel structure from appearing in the X-ray image. A remote source 22L of low energy light radiation, preferably a tungsten-halogen source, is coupled to the light emitting panel 22F through polished fiber ends of the light emitting panel 22F in order to provide low energy light radiation into the light emitting panel 22F. Light transmitted into the optic fibers is emitted from the sides of the fibers, passes through the conductive layer 9 and the dielectric layer 11, and then onto the photoconductive layer 8. The selection of multiple layers of woven optic fibers allows more efficient use of the low energy light radiation source 22L, and enhances the brightness and uniformity of the low energy light radiation incident on the top conductive layer 9.

In the preferred embodiment, the light exposure means L further comprises a second light emitting panel 22S positioned below the substrate 7 and displaced a small distance, for example 2 millimeters, from the substrate 7. The second panel 22S is adapted to provide a second pattern of low energy light radiation over the substrate 7 and therethrough onto the photoconductive layer 8. Preferably, the light emitting panel 22S is an electroluminescent low energy light radiation panel, such as a panel commercially available from BKL, Inc., King of Prussia, Pa., under the tradename "Aviation Green N3." This panel 22S is composed of electroluminescent material sandwiched between thin foils of ITO and Al and is capable of providing a uniform pattern of low energy light radiation having wavelengths in the 400 to 800 nanometer range, and providing energy per unit area in the range from 20 to 1000 erg/cm$^2$, preferably about 400 erg/cm$^2$. In this second panel 22S, the source of low energy light radiation is energy emission from the electroluminescent material in response to power provided to the light emitting panel 22S. The light emitting panel 22S is oriented so that the ITO-coated surface is adjacent to the image capture panel 10. This second pattern of low energy light radiation is selected to have wavelengths and energy such that the light is capable of penetrating the dielectric substrate 7, the microplates 24n and 26n, the collecting elements 6n and the charge blocking layer 28 with minimal absorption but being essentially totally absorbed near the bottom portion of the photoconductive layer 8. As shown in FIG. 2, the first light emitting panel 22F is co-extensive with the array of sensors 12n. The second light emitting panel 22S is shown in dashed lines and is also co-extensive with the array of sensors 12n.

In operation, an imagewise modulated pattern of X-ray radiation is incident upon the image capture panel 10 which is positioned proximate the patient. However, prior to exposure of a patient to a uniform pattern of X-ray radiation, electrical charges residual in the image capture panel 10 are minimized in order to eliminate false or ghost image patterns. First, the operating bias voltage from the power supply 19P is reduced to zero, and all readout switch gates 21 are activated to bring the collecting elements 6n and the top conductive layer 9 to a common zero potential. Next, the first light emitting panel 22F is activated to flash expose the photoconductive layer 8 to a first uniform pattern of low energy light radiation. This first flash exposure is adjusted in energy to create sufficient electrical charge carriers within the photoconductive layer 8 to partially neutralize residual electrical charges remaining within the bulk of the photoconductive layer 8 and remaining near the interface between the photoconductive layer 8 and the top dielectric layer 11. Using the tungsten-halogen light source 22L coupled to the low energy light radiation emitting panel 22F, a light radiation flash exposure providing energy in the range from 20 to 1000 erg/cm$^2$ over a time interval of 1 to 30 seconds has proved adequate. This first creation of free electrical charges serves to partially eliminate any localized higher level accumulations of electrical charges trapped within the bulk of the photoconductive layer 8 and remaining near the interface between the photoconductive layer 8 and the sensors 12n prior to activation of the second light emitting panel 22S. If the localized higher level accumulations of electrical charges are not initially reduced in intensity, it is possible that during a subsequent discharging operation, described hereinafter, certain portions of the electrical readout means 5n, particularly the switching devices 14n, may experience a surge in charge current density greater than the load limit of the electrical readout means 5n, thereby causing failure of the readout means 5.

The second light emitting panel 22S is next activated to flash expose the photoconductive layer 8 to a second uniform pattern of low energy light radiation. This second flash exposure is adjusted to have an energy output that produces an abundant supply of electron-hole pairs within the photoconductive layer 8 sufficient to effectively neutralize or eliminate all residual electrical charges trapped either within the bulk of the photoconductive layer 8 or near the interface between the photoconductive layer 8 and the sensors 12n. By eliminating the residual electric charges, the electric field that exists across the dielectric layer 11 is eliminated. When the above-mentioned "Aviation Green N3" electro-luminescent low energy light radiation panel is employed, a low energy light radiation flash exposure providing energy per unit area in the range from 20 to 1000 erg/cm$^2$ over a time interval of 1 to 30 seconds has been found adequate to fully neutralize any residual charges remaining within the photoconductive layer 8. Because the first uniform pattern of low energy light radiation partially reduced the magnitude of localized residual electrical charges, the overall reduced distribution in the amplitudes of residual electric fields across the dielectric layer 11 is minimized, and the danger of exceeding the current capabilities of the readout means 5 is minimized during subsequent elimination of these charges by the second flash exposure.

Figure 3:
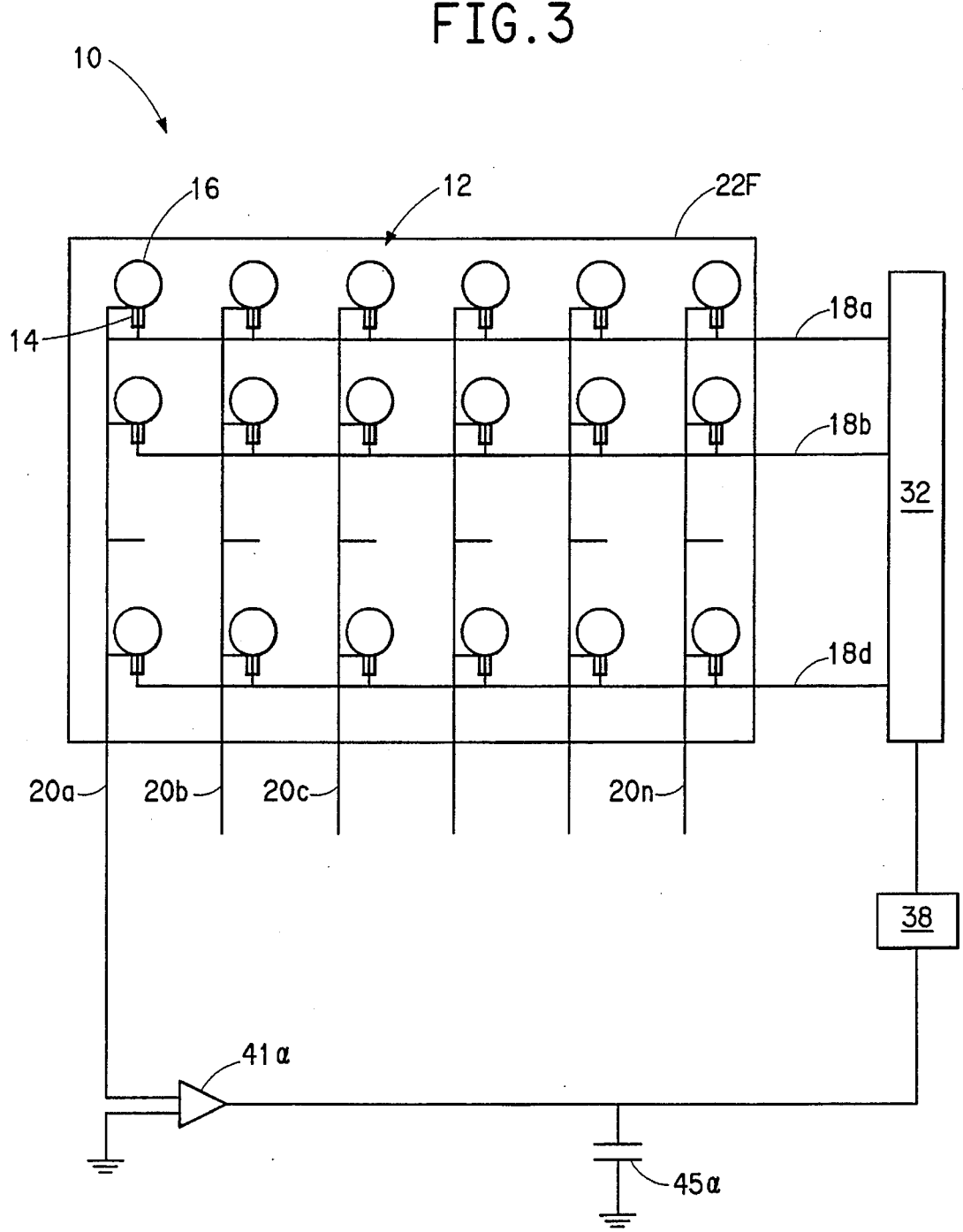
FIG. 3 is another schematic top view of the X-ray image capture element shown in FIG. 1.

FIG. 3 shows the operation of the image capture panel 10 during image capture and readout. Each readout line 20n is connected to a readout means 34 comprising a charge integrating amplifier device 41n, and a sample-and-hold circuit 45n. The output of circuit 45n may be sampled sequentially to obtain an X-ray radiation image output signal, and the technology to do this is well known in the art. Additional electronic manipulations not related to the present invention may be performed before or after image capture to enhance the overall quality of the final radiation image.

A patient to be examined is exposed to a uniform pattern of X-ray radiation producing an imagewise modulated pattern of X-ray radiation incident on the image capture panel 10. This pattern generates a corresponding imagewise modulated pattern of electrical charges in the array of sensing elements 16n. After X-ray radiation exposure is completed, a microprocessor controller 38 causes the multiplexing device 32 to read out a pattern of electrical charge values corresponding to the pattern of X-ray radiation absorption in the patient.

After the readout signal has been recovered, the panel 10 is cleared of any residual charges using the sequence of reducing the distribution in the amplitudes of residual electrical charges remaining near the surface 2 of the photoconductive layer 8 and, thereafter, fully eliminating all residual electric charges retained near the surface 3 of the layer 8, using the first and second exposure devices 22F and 22S, respectively, as described herein. This residual charge reduction process may be repeated if appropriate until all the trapped charges are removed and the image capture panel 10 is prepared for a subsequent image capture operation.

In the present invention, both the first and the second patterns of light radiation may be provided from a single light emitting panel, e.g., the second light emitting panel 22F. However, in the preferred embodiment, the first light emitting panel 22F is cooperatively combined with the second light emitting panel 22S in order to eliminate all residual electrical charges without exceeding the current capabilities of the readout means 5. The first panel 22F is utilized to reduce the overall intensity of any remaining trapped electrical charges, while the second panel 22S serves to completely eliminate all remaining electrical charges.

Figure 4A:
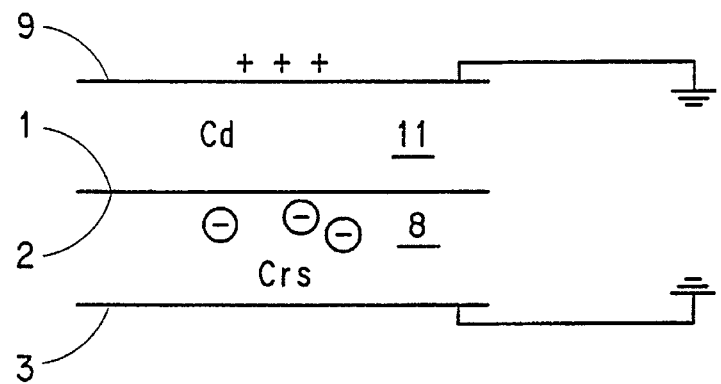
FIGS. 4a, 4b and 4c are schematic views illustrating the present method.

FIG. 4a shows a simplified electrical description of this combination of intensity reduction of localized trapped electrical charges prior to elimination of all trapped electrical charges. The preferred process for neutralizing any residual charges remaining within the photoconductive layer 8 utilizes two sources of low energy light radiation 22F and 22S. Although the readout means 5 and the top conductive layer 9 are shorted to ground, and the operating bias voltage from the power supply 19P is reduced to zero, an uneven distribution of electrical charges may remain "trapped" within the photoconductive layer 8 because of the limited charge transport range of the "minority carrier" of the radiation induced electron-hole pair. These charges are trapped in the bulk of the photoconductive layer 8 as well as near the interface with the dielectric layer 11, and attract electric charges of the opposite polarity in the nearby grounded layers. The dielectric layer 11 and the radiation sensitive photoconductive layer 8 thus form two capacitors in series, designated as Cd and Crs, respectively, for each of the sensors 12n. In FIG. 4a, the lower surface of the dielectric layer 11 is indicated by the character 1, and the juxtaposed surface of the photoconductive layer 8 is indicated by the character 2. When the photoconductive layer 8 has positively charged holes as the "majority carrier", such as P type selenium, the minority charge carriers created in the layer 8 by an incident imagewise modulated pattern of radiation will have a limited charge transport range and a corresponding shorter range within the bulk of the layer 8. Consequently, following a first radiation exposure and readout operation similar to that described above, trapped charges residual in the photoconductive layer 8, shown as "−" charges, will generally be non-uniformly distributed throughout the image capture panel 10.

Figure 4B:
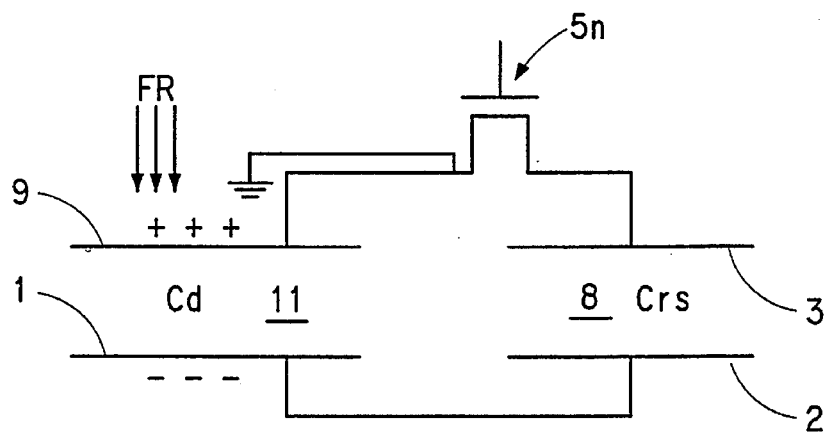

FIG. 4b shows a simplified electrical equivalent circuit illustrative of the present invention wherein the first flash exposure, indicated by FR in FIG. 4b, is incident through the top dielectric layer 11 and into the photoconductive layer 8. As described above, this first flash exposure is largely absorbed near the surface of the photoconductive layer 8 but is adjusted in energy to create sufficient electron-hole pairs within the photoconductive layer 8 to combine with residual trapped electrical charges and partially eliminate any electrical charges retained primarily near the surface 2 of the photoconductive layer 8. Because of the limited charge transport range of the minority charge carriers, only a limited number of the residual trapped electrical charges will be eliminated. However, by partially reducing the number of residual trapped electrical charges, the first flash exposure beneficially produces an overall reduced maximum amplitude of residual electric fields in Cd throughout the sensors 12n within the panel 10.

Figure 4C:
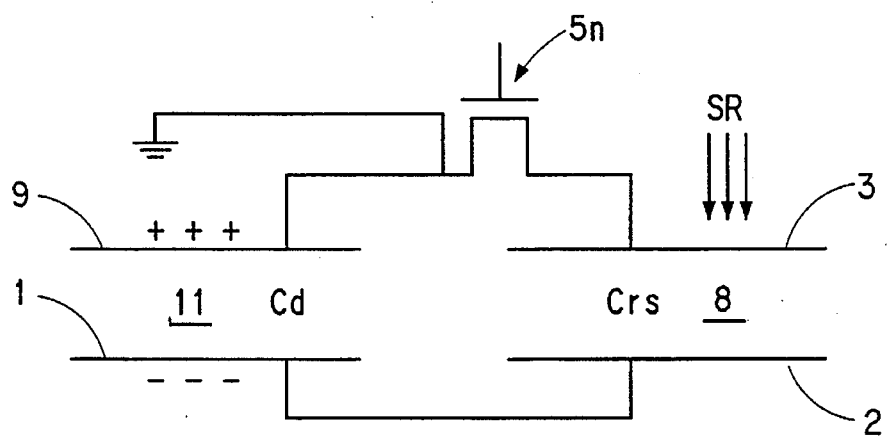

FIG. 4C shows a simplified electrical equivalent circuit illustrative of the present invention wherein the second flash exposure, indicated by SR in FIG. 4c, is incident through the dielectric substrate 7 and through the plurality of sensors 12n. As described above, this second flash exposure is largely absorbed near the surface of the photoconductive layer 8 but is adjusted in energy to create sufficient electron-hole pairs within the photoconductive layer 8 to combine with the residual trapped electrical charges, thereby fully eliminating all residual electric charges retained within the panel 10. The second flash exposure SR may be performed by applying the second pattern at a rate in the range from 20 to 800 erg/cm$^2$ per second. Preferably, the second flash exposure rate is time-wise adjusted so that the incident radiation is applied at an increasing rate from 20 to 800 erg/cm$^2$ per second, thereby generating a slowly increasing number of electron-hole pairs while eliminating the residual electrical charges. This process of first reducing the distribution in the amplitudes of residual electrical charges remaining near the surface 2 of the photoconductive layer 8 and thereafter fully eliminating all residual electrical charges retained near the top conductive layer 9 is effective in protecting the readout means 5n within the panel 10 because the amplitudes of electric fields attributable to residual charges being discharged from the panel 10 through the readout means 5n are lowered.

In an alternative embodiment, an N type radiation sensitive material may be used, such as cadmium selenide which has negatively charged electrons as the "majority carrier". In this instance, the minority charge carriers, which are created in the photoconductive layer 8 and have a limited charge transport range, are positively charged. The process described above is again effective in protecting the readout means 5n within the panel 10 although the operating bias voltage applied to the top conductive layer 9 is reversed.

What is claimed is:

1. In an image capture panel including a substrate layer of dielectric material having a top surface and a bottom surface, a plurality of sensors arrayed adjacent the top surface of said substrate layer, and a radiation sensitive layer having a bottom surface disposed over said sensors and a top surface opposite the bottom surface of said radiation sensitive layer, each of said sensors having a switching device and a sensing element, the improvement comprising a first light emitting panel positioned adjacent the top surface of said radiation sensitive layer to provide a first substantially uniform pattern of light radiation over said radiation sensitive layer, and a second light emitting panel positioned adjacent the bottom surface of said substrate layer to provide a second substantially uniform pattern of light radiation over said substrate layer, said substrate layer and each sensing element have an optical density that is substantially transparent to light radiation from said panels, thereby allowing the light radiation to penetrate therethrough and reach the bottom surface of said radiation sensitive layer.

2. An image capture panel in accordance with claim 1 wherein said first light emitting panel comprises material having a uniform X-ray density.

3. An image capture panel in accordance with claim 2 further comprising means disposed adjacent the top surface of said substrate layer for electronically accessing each of said switching devices individually.

4. An image capture panel in accordance with claim 3 wherein each switching device comprises a thin-film field effect transistor (FET) having a source connected to said sensing element, and a drain and a gate both connected to said means for accessing.

5. An image capture panel in accordance with claim 1 wherein said radiation sensitive layer comprises a layer of photoconductive material.

6. An image capture panel in accordance with claim 1 wherein the first pattern of radiation comprises radiation having wavelengths in the range from 400 to 800 nanometers.

7. An image capture panel in accordance with claim 1 wherein the first pattern of radiation provides energy per unit area in the range from 20 to 1000 erg/cm$^2$.

8. An image capture panel in accordance with claim 1 wherein the second pattern of radiation comprises radiation having wavelengths in the range from 400 to 800 nanometers.

9. An image capture panel in accordance with claim 1 wherein the second pattern of radiation provides energy per unit area in the range from 20 to 1000 erg/cm$^2$.

10. An image capture panel in accordance with claim 1 wherein the first light emitting panel is co-extensive with the array of sensors.

11. An image capture panel in accordance with claim 1 wherein the second light emitting panel is co-extensive with the array of sensors.

12. A method for eliminating residual charges in an image capture panel including a substrate layer of dielectric material having a top surface and a bottom surface, a plurality of sensors arrayed adjacent the top surface of said substrate layer, and a radiation sensitive layer having a bottom surface disposed over said sensors and a top surface opposite the bottom surface of said radiation sensitive layer, said method comprising:

exposing said radiation sensitive layer to a first substantially uniform pattern of light radiation for partially neutralizing residual electrical charges trapped within said image capture panel; and exposing said radiation sensitive layer to a second substantially uniform pattern of light radiation sufficient to neutralize substantially all residual electrical charges trapped within said image capture panel.

13. A method in accordance with claim 12 wherein said first exposing step is performed by positioning a first light emitting panel adjacent the top surface of said radiation sensitive layer, and wherein said second exposing step is performed by positioning a second light emitting panel adjacent the bottom surface of said substrate layer.

14. A method in accordance with claim 12 wherein the first pattern of radiation comprises radiation having wavelengths in the range from 400 to 800 nanometers.

15. A method in accordance with claim 12 wherein the first pattern of radiation provides energy per unit area in the range from 20 to 1000 erg/cm$^2$.

16. A method in accordance with claim 12 wherein the second pattern of radiation comprises radiation having wavelengths in the range from 400 to 800 nanometers.

17. A method in accordance with claim 12 wherein the second pattern of radiation provides energy per unit area in the range from 20 to 1000 erg/cm$^2$.

18. A method in accordance with claim 12 wherein said second exposing step is performed by applying said second pattern at a rate in the range from 20 to 800 erg/cm$^2$ per second.

19. A method in accordance with claim 18 wherein said second exposing step is performed by applying said second pattern at a time-wise adjusted rate that increases between 20 and 800 erg/cm$^2$ per second.

* * * * *